Aug. 18, 1959     A. A. BURRIS, JR     2,899,771

INSECT RESISTANT VAPOR BARRIER

Filed Oct. 20, 1958

INVENTOR.
ALONZO A. BURRIS, JR.

BY

ATTORNEY

2,899,771

INSECT RESISTANT VAPOR BARRIER

Alonzo A. Burris, Jr., Mount Pleasant, S.C.

Application October 20, 1958, Serial No. 768,077

7 Claims. (Cl. 43—124)

This invention relates to an improved insect resistant vapor barrier for use in building construction.

An important object of this invention is the provision of a flexible vapor barrier carrying a water emulsifiable insecticide which is exposed so that upon contact with vapor the insecticide will be released into the surrounding area.

Another object of this invention is to provide an insect resistant vapor barrier which will be especially useful in the so called slab on ground construction since contact with moisture releases the insecticide into the soil to kill termites and the like before they have had an opportunity to eat or bore their way into the barrier.

Another object of this invention is to provide a barrier which not only serves to prevent entry of vapor into building structures and the like but also resists the entry of insects and yet requires no special equipment for its application.

Another object of this invention is to provide an improved insect resistant vapor barrier for building construction and the like which is easy to handle and which may be applied by lay workmen.

Another important object of this invention is the provision of a vapor barrier for use in construction in which an insecticide is carried therewith as an integral unit and in which the insecticide is dispersed into the surrounding area so as to prevent the entry of termites through cracks or tears which may appear in the barrier.

Still another object of this invention is the provision of a device for both preventing the entry of moisture and insects into buildings and the like at reduced cost and yet do so exceedingly effectively.

Figure 1:
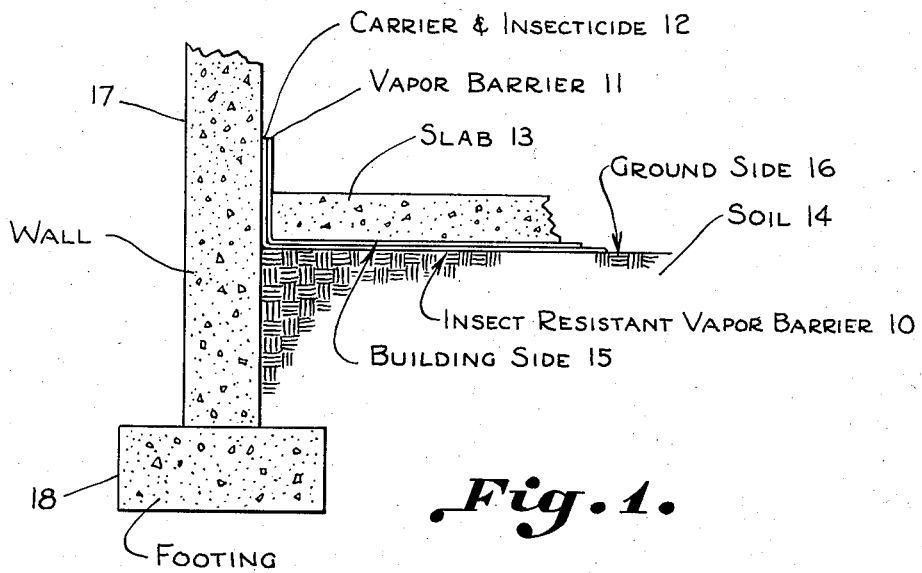
Figure 2:
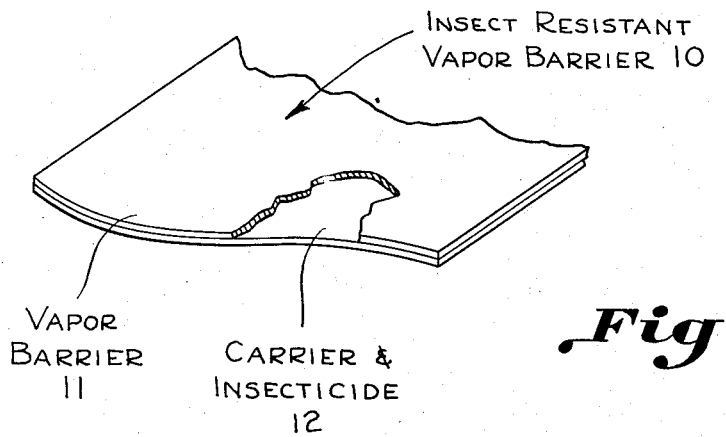

Other objects will appear to those skilled in the art relating to building construction when this specification is read in connection with the accompanying drawing in which:

Figure 1 is a transverse sectional view illustrating a slab on grade construction and a vapor barrier constructed in accordance with the present invention, and Figure 2 is an enlarged perspective view illustrating a vapor barrier constructed in accordance with the present invention.

The invention is especially useful in that, in a single application of a unitary flexible film, buildings and the like are effectively protected against the entry of moisture and insects. The vapor barrier itself is protected because the insecticide is dispersed into the surrounding area to kill insects before they have an opportunity to bore in the barrier. The subject of the invention is especially effective in preventing the entry of insects since the dispersed insecticide kills insects even though they do not actually contact the barrier thus affording them no opportunity to enter the building and the like through a hole in the barrier which may be inadvertently placed therein during installation or purposely placed therein to accommodate plumbing and the like. Since the water soluble resin is impregnated the barrier is safe and easy to handle.

The invention generally contemplates the provision of an insect resistant vapor barrier 10 which includes a flexible relatively thin vapor barrier 11 such as a polyethylene film coated with a flexible water soluble carrier 12 such as "Polyox" impregnated with an insecticide which is effective against termites and the like such as dieldrin. The vapor barrier and the impregnated carrier are preferably laminated into a single unit as shown in the drawing. In use the condensation occasioned by the use of a vapor barrier is effective to disperse the insecticide.

An insect resistant vapor barrier constructed in accordance with the present invention is particularly useful in slab on grade type construction since heretofore the effectiveness of treating the soil under a slab that has been capped is doubtful. Slab on grade foundation construction is well known to the building trade and is such that normally an entire concrete slab 13 essentially bears on the soil or fill 14 as illustrated in Figure 1. The insect resistant vapor barrier constructed in accordance with the present invention is positioned between the building or slab side 15 and the ground side 16. A portion of the insect resistant vapor barrier 10 is shown extending upwardly between the slab 13 and a conventional wall 17 which is supported by a footing 18 to form part of a building.

The invention, however, is not limited to use in this type construction and can be used in other types of construction including buildings that have crawl space in the same manner with excellent results. Slab on grade buildings, however, are particularly susceptible to termite damage especially if the soil under the slab has not been treated prior to capping the slab. Thus, by applying a barrier constructed in accordance with the present invention prior to pouring the slab a two fold purpose is served: First, the moisture that normally enters the building through the concrete slab by capillary action is turned back. Polyethylene has long been recognized in the building trade as a desirable vapor barrier, and secondly, the barrier will also serve as a simplified way of getting insecticides that are effective against termites into the soil to act as a soil poison.

Other vapor termite barriers have been proposed using an insecticide impregnated asphalt building paper as a combination barrier. This type of barrier also makes use of a thin sheet of polyethylene to retain the insecticide crystals in the building paper. Such barriers as these could not, however, serve the primary purpose of an insecticide soil poison since it is necessary for the termites to actually gnaw their way through the polyethylene into the barrier containing insecticide, since no provision is made to actually distribute the technical insecticides into the soil which is the accepted method for treating termites. The main object in treating against subterranean termites is to poison the soil. Limitations of such vapor termite barriers are thus evident.

In a preferred example of my invention a film of water soluble resin known as "Polyox" is impregnated with an insecticide. These water soluble resins can be processed by various thermoplastic techniques such as calendering, extrusion, casting and injection molding preferably at temperatures ranging from 75° to 170° C. "Polyox" is the trademark of Union Carbide Chemicals Company, a division of Union Carbide Corporation of New York, N.Y., for water soluble resins and are a series of high molecular weight polymers of ethylene oxide. Several such suitable water soluble resins are described in an Advance Technical Information sheet of Union Carbide entitled, "Polyox" dated April 1958.

In extrusion operations it has been found desirable to limit the percent stretch induced by the take up roll used in these operations. The polymer has limited extensibility in the molten stage. Since the water soluble resin film is to be laminated with polyethylene film, it is not necessary for the film to be run on cool after rollers following calendering or extrusion. The insecticide to be used should be selected from a group recommended for soil poisoning against termites by the U.S. Department of Agriculture Forest Service. Among those presently recommended by the U.S. Department of Agriculture Forest Service are:

Benzene hexachloride—0.8% gamma #2 fuel oil or water emulsifiable
Chlordane (octachloro-4-7 methano-tetrahydroindane)—1.0% in #2 fuel oil or water emulsifiable
Dieldrin (1,2,3,4,10,10-hexachloro-6,7, epoxy-1,4,4a,5,6, 7,8,8a-octahydro-1,4-endo, exo-5,8-dimethanonaphthalene)—0.5% in #2 fuel oil or water emulsifiable
DDT (dichlorodiphenyl trichloroethane)—8.0% in #2 fuel oil
Trichlorobenzene—25.0% by volume in #2 fuel oil
Sodium arsenite—10% in water Using the extrusion or calendering technique for forming a film, the insecticide may be introduced at several points. An example of introducing the technical insecticide in the water soluble film is as follows. Selecting dieldrin as the insecticide to be used, 0.0042 lbs. of technical dieldrin crystals is blended for every sq. ft. of water soluble resin film to be manufactured and 0.0062 lbs. of powdered resin for each sq. ft. mill of water soluble resin to be manufactured. The amounts of insecticide and resin stated above are the amounts required to produce a film having an area of one square foot and a thickness of one mill. If a film of different thickness is desired, these figures are then multiplied by the thickness desired expressed in mills. The technical insecticide and the powdered resin are thoroughly mixed so that the insecticide is distributed uniformly throughout. The thoroughly blended material then is put through a normal extrusion process.

Another example of extrusion is as follows. The insecticides are dissolved in a suitable solvent, preferably one having high vapor pressure. For dieldrin one solvent that may be used with excellent results is perchloroethylene although other solvents may be equally suitable. The solution containing the insecticide is then added to the dry resin and thoroughly mixed so that the insecticide is distributed uniformly throughout. Then the solvent is allowed to evaporate leaving the insecticide in crystalline form uniformly distributed throughout the powdered resin and the normal extrusion process is then carried forward.

After the water soluble resins are formed into films they are then laminated to polyethylene film. Such lamination between the water soluble resin film and the polyethylene film may be accomplished by heat sealing in a temperature range from 60°–100° C. Any suitable means may be used to unite the impregnated resin film with the polyethylene film including simply gluing them together to form a laminated structure by any suitable glue.

While the specification has been written in terms of the preferred vapor barrier film and water soluble resin film, it will nevertheless be understood that other materials may be substituted therefor, without departing from the scope of the invention. In place of polyethylene film, other strong inert water vapor barrier films may be used, such as polytetrafluoroethylene or polyvinyl chloride. In place of the water soluble resin Polyox, there may be substituted other suitable water soluble resins or the like, which are capable of retaining a suitable quantity of insecticide and releasing same on exposure to moist soil. Such materials include polyvinyl alcohol, sodium alginate, a Carbowax (any one of a group of non volatile, solid polyethylene glycol soluble both in water and aromatic solvents) and sodium carboxymethylcellulose.

While the invention has been described in terms of certain examples, such examples are to be construed as illustrative rather than limiting, and it is intended to cover all modifications, embodiments and equivalents which fall within the spirit and scope of the appended claims.

What is claimed is:

1. A building construction including, a relatively thin flexible vapor barrier, a water soluble carrier capable of retaining an effective quantity of insecticide and releasing same on exposure to moisture, covering a substantial portion of said barrier and being fully exposed to contact by moisture, and an insecticide carried by said water soluble carrier, wherein the vapor barrier is positioned between the building side and the ground side so that the water soluble carrier is so exposed to moisture presenting itself from the ground side as to release insecticide to resist the entry of insects into the building.

2. A slab on grade building construction including, a polyethylene film, a water soluble resin film covering a substantial portion of said polyethylene film and being fully exposed to contact by moisture, and an insecticide carried by said water soluble resin, wherein the polyethylene film is positioned between the slab side and the ground side so that the resin film is so exposed to moisture presenting itself from the ground side as to release insecticide into the ground to resist the entry of insects into the building.

3. An insect resistant vapor barrier for use in building construction and the like including, a relatively thin flexible vapor barrier, a water soluble carrier capable of retaining an effective quantity of insecticide and releasing same on exposure to moisture covering a substantial portion of said barrier and being fully exposed to contact by moisture, and an insecticide carried by said water soluble carrier, whereby the insecticide will be dispersed upon contact with moisture.

4. An insect resistant vapor barrier for use in building construction and the like including, a polyethylene film, a water soluble resin film covering a substantial portion of said polyethylene film and being fully exposed to contact by moisture, and an insecticide carried by said water soluble resin, whereby the insecticide will be dispersed upon contact with moisture.

5. An insect resistant vapor barrier for use in building construction and the like including, a polyethylene film, a high molecular weight polymer of ethylene oxide film covering a substantial portion of said polyethylene film and being adapted to be fully exposed to contact by moisture, and an insecticide carried by said ethylene oxide film, whereby the insecticide will be dispersed upon contact with moisture.

6. An insect resistant vapor barrier for use in building construction and the like including, a polyethylene film, a relatively thin film of a high molecular weight polymer of ethylene oxide, and an insecticide impregnated into said relatively thin film of a high molecular weight polymer of ethylene oxide, said films being laminated into a unitary flexible barrier, whereby the insecticide will be dispersed upon contact with moisture.

7. An insect resistant vapor barrier for use in building construction and the like including, a polyethylene film, a water soluble resin film, and an insecticide impregnated into said water soluble resin, said films being laminated into a unitary flexible barrier, whereby the insecticide will be dispersed upon contact with moisture.

No references cited.